(12) United States Patent
Guillouet et al.

(10) Patent No.: US 11,467,307 B2
(45) Date of Patent: Oct. 11, 2022

(54) METHODS AND DATA PROCESSING APPARATUS FOR DEBLENDING SEISMIC DATA

(71) Applicant: CGG SERVICES SAS, Massy (FR)

(72) Inventors: Matthieu Guillouet, Paris (FR); Anne Berthaud, Antony (FR); Thomas Bianchi, Paris (FR)

(73) Assignee: CGG SERVICES SAS, Massy (FR)

( * ) Notice: Subject to any disclaimer, the term of this patent is extended or adjusted under 35 U.S.C. 154(b) by 959 days.

(21) Appl. No.: 15/559,492

(22) PCT Filed: Dec. 14, 2015

(86) PCT No.: PCT/IB2015/002445
§ 371 (c)(1),
(2) Date: Sep. 19, 2017

(87) PCT Pub. No.: WO2016/162724
PCT Pub. Date: Oct. 13, 2016

(65) Prior Publication Data
US 2018/0113230 A1    Apr. 26, 2018

Related U.S. Application Data

(60) Provisional application No. 62/145,518, filed on Apr. 10, 2015.

(51) Int. Cl.
*G01V 1/36* (2006.01)

(52) U.S. Cl.
CPC ............. *G01V 1/368* (2013.01); *G01V 1/364* (2013.01); *G01V 2210/127* (2013.01); *G01V 2210/23* (2013.01); *G01V 2210/48* (2013.01)

(58) Field of Classification Search
CPC ... G01V 1/368; G01V 1/364; G01V 2210/127
See application file for complete search history.

(56) References Cited

U.S. PATENT DOCUMENTS 6,219,621 B1 *  4/2001  Hornbostel ............. G01V 1/36
                                                              702/16
8,295,124 B2   10/2012  Abma
(Continued)

FOREIGN PATENT DOCUMENTS

| WO | 2012047384 A1 | 4/2012 |
| WO | 2014177522 A2 | 11/2014 |
| WO | 2015063597 A1 | 5/2015 |

OTHER PUBLICATIONS

Saab et al, "Curvelet-based primary-multiple separation from a Bayesian perspective", UBC Math, pp. 1-5 (Year: 2007).*

(Continued)

*Primary Examiner* — Lisa E Peters
(74) *Attorney, Agent, or Firm* — Patent Portfolio Builders PLLC

(57) ABSTRACT

Seismic data is deblended by performing, for each receiver, a first inversion and a second inversion in a transform domain. The first inversion is formulated to minimize a number of non-zero coefficients of the first inversion result. A sub-domain of the transform domain is defined by vectors of a transform domain basis for which the first inversion has yielded the non-zero coefficients. The second inversion is performed in this sub-domain. The solution of the second inversion is used to extract deblended seismic datasets corresponding to each of the distinct signals, from the seismic data.

20 Claims, 6 Drawing Sheets

(56) References Cited

U.S. PATENT DOCUMENTS

| 8,509,028 | B2 | 8/2013 | Neelamani et al. |
| 8,675,447 | B2 | 3/2014 | Poole |
| 2010/0212909 | A1* | 8/2010 | Baumstein ............ G01V 11/00 166/369 |
| 2012/0269034 | A1* | 10/2012 | Neelamani ............ G01V 1/005 367/73 |
| 2016/0116620 | A1* | 4/2016 | Sassen ................. G01V 1/368 702/17 |

OTHER PUBLICATIONS

Shah et al, WO 2013093468 (Year: 2013).*
Amir Beck et al., "A Fast Iterative Shrinkage-Thresholding Algorithm for Linear Inverse Problems", Siam J. Imaging Sciences, 2009, pp. 183-202, vol. 2, No. 1.
Araz Mahdad et al., "Separation of blended data by iterative estimation and subtraction of blending interference noise", Geophysics, May-Jun. 2011, pp. Q9-Q17, vol. 76, No. 3.
Chengbo Li et al., "Joint source deblending and reconstruction for seismic data", SEG Houston 2013 Annual Meeting, Sep. 22-27, 2013, pp. 82-87.
David L. Donoho, "Compressed Sensing", IEEE Transactions on Information Theory, Apr. 2006, pp. 1289-1306, vol. 52, No. 4.
Emmanuel Candès et al., "Fast Discrete Curvelet Transforms", Multiscale Model. Simul., 2006, pp. 861-899, vol. 5, No. 3.
Emmanuel Candes et al., "Stable Signal Recovery from Incomplete and Inaccurate Measurements", 2005, pp. 1-15.
Emmanuel J. Candès et al., "Enhancing Sparsity by Reweighted $\ell$ Minimization", J. Fourier Anal. Appl., 2008, pp. 877-905, vol. 14.
Emmanuel J. Candès et al., "The Curvelet Representation of Wave Propagators is Optimally Sparse", Jun. 2004, pp. 1-44.
Felix J. Herrmann et al., "Curvelet-based seismic data processing: A multiscale and nonlinear approach", Geophysics, Jan.-Feb. 2008, pp. A1-A5, vol. 73, No. 1.
Matthieu Guillouet et al., "Recovery of blended data: a sparse coding approach for seismic acquisition", 78th EAGE Conference & Exhibition, May 30-Jun. 2, 2016, Vienna, Austria.
S. Mahrooqi et al., "DS3 Recording for Faster Seismic Acquisition Rate without Data Compromise", 74th EAGE Conference & Exhibition, Copenhagen, Denmark, Jun. 4-7, 2012.
Tim T.Y. Lin et al., "Unified compressive sensing framework for simultaneous acquisition with primary estimation", SEG Houston 2009 International Exposition and Annual Meeting, Oct. 26-30, 2009, pp. 3113-3117.
Truong T. Nguyen et al., "Uniform Discrete Curvelet Transform", IEEE Transactions on Signal Processing, Jul. 2010, pp. 3618-3634, vol. 58, No. 7.
Yanhui Zhou et al., "Seismic deblending by sparse inversion over dictionary learning", SEG Houston 2013 Annual Meeting, Sep. 22-27, 2013, pp. 273-278.
International Search Report, and Written Opinion, dated Apr. 12, 2016, from corresponding PCT Application No. PCT/IB2015/002445.
Examination Report in corresponding/related Great Britain Application No. GB1716718.0 dated Apr. 8, 2020. (All references not cited herewith have been previously made of record.).

* cited by examiner

METHODS AND DATA PROCESSING APPARATUS FOR DEBLENDING SEISMIC DATA

CROSS REFERENCE TO RELATED APPLICATIONS

The present application is a National Stage of PCT Application No. PCT/IB2015/002445, filed on Dec. 14, 2015, which claims priority and benefit from U.S. Provisional Patent Application No. 62/145,518, filed on Apr. 10, 2015, for "Simultaneous Source Separation" the content of which is incorporated in its entirety herein by reference.

BACKGROUND

Technical Field

Embodiments of the subject matter disclosed herein generally relate to deblending data acquired with receivers detecting simultaneously reflections due to distinct signals, in particular, to methods that perform first an inversion to select a transform sub-domain including the underground formation's response, and a least square inversion to obtain a solution in the sub-domain.

Discussion of the Background

Structure of underground formations is customarily explored with seismic surveys to generate images used, for example, to locate gas and oil reservoirs. The seismic surveys acquire and study reflections of seismic signals injected in the surveyed formations. The signals are reflected, refracted and/or transmitted when encountering variations of propagation velocity. Receivers detect and record these reflections as seismic data. In time, the amount of seismic data and the complexity of data processing have increased tremendously due to the increased data processing capacity (both hardware and software) and development of survey equipment (seismic signal sources, receivers, etc.). These improvements have yielded sharper images of the underground formations, for bigger volumes and based on a higher density of information. The time necessary to acquire the survey data has continued to remain an important limitation to the cost-effectiveness of this type of geological prospecting.

One way to shorten the survey time is using a technique known as "simultaneous source acquisition." In this type of acquisition, time intervals between source activations (i.e., generating signals incident to the surveyed underground formation) are shorter than a listening time necessary to record all the reflections after one source's activation. Simultaneous source acquisition is now performed on land and in marine environments (with ocean bottom receivers or towed streamers), with continuous or non-continuous recording. Using simultaneous source acquisition yields blended data (i.e., generated by receivers detecting overlapping reflections due to different incident signals), and, therefore, an additional data pre-processing (known as "deblending") becomes necessary to extract datasets for each incident signal.

Numerous deblending algorithms have been developed in the last 10 years. However, these algorithms usually exploit particular data acquisition features related to geometry (source and receiver positions) and/or emitted signals (randomness of one source shooting relative to other shots, phase encoding, etc.).

Accordingly, it is desirable to develop efficient deblending methods usable for data gathered in more (or most) simultaneous source acquisition scenarios.

SUMMARY

Deblending of simultaneous source acquisition data in receiver gathers is performed in two phases: in a first phase, the support (relevant solution components) in a transformed domain is identified, and, in a second phase, the solution is sought by a least square inversion in the restricted support.

According to an embodiment, there is a deblending method for seismic data recorded by a receiver detecting simultaneously reflections due to distinct signals. The method includes receiving the seismic data and emitted signal information, and performing a first inversion of the seismic data, the first inversion being formulated to minimize a number of non-zero coefficients of a first inversion result in a transform domain. The method then includes performing a second inversion of the seismic data seeking an underground formation response in a sub-domain of the transform domain, the sub-domain being defined by vectors of a transform domain basis for which the first inversion result has the non-zero coefficients. The method then includes using the underground formation response obtained in the second inversion, to extract at least one deblended dataset corresponding to one of the distinct signals, from the seismic data.

According to an embodiment, there is a data processing apparatus having an interface configured to receive seismic data recorded by a receiver detecting simultaneously reflections due to distinct signals, and emitted signals information, and a data processing unit. The data processing unit is configured to perform a first inversion of the seismic data, the first inversion being formulated to minimize a number of non-zero coefficients of a first inversion result in a transform domain, and a second inversion of the seismic data seeking an underground formation response in a sub-domain of the transform domain, the sub-domain being defined by vectors of a transform domain basis for which the first inversion result has the non-zero coefficients. The data processing unit is also configured to extract at least one deblended dataset corresponding to one of the distinct signals, from the seismic data using the underground formation response obtained in the second inversion.

According to another embodiment there is a computer-readable recording medium storing executable codes which, when executed by a data processing unit make the data processing unit to perform a seismic data deblending method. The method includes receiving the seismic data and emitted signal information, and performing a first inversion of the seismic data, the first inversion being formulated to minimize a number of non-zero coefficients of a first inversion result in a transform domain. The method then includes performing a second inversion of the seismic data seeking an underground formation response in a sub-domain of the transform domain, the sub-domain being defined by vectors of a transform domain basis for which the first inversion result has the non-zero coefficients. The method then includes using the underground formation response obtained in the second inversion, to extract at least one deblended dataset corresponding to one of the distinct signals, from the seismic data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to land seismic data acquisition. However, similar embodiments and methods may be used for a marine data acquisition system and for surveys using electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In various embodiments detailed in this section, deblending data in receiver gathers employs two minimizations seeking underground formation's response in a transform domain. A sparse inversion minimizes a two-term cost function including a data matching term and a weighted norm of the solution (i.e., a vector) in the transform domain. The solution of this first inversion is used to select a sub-domain including the underground formation's response (i.e., the solution's restricted support). Then, a least square inversion seeks the underground formation's response in this sub-domain, such that a data matching term to be minimized.

Figure 1:
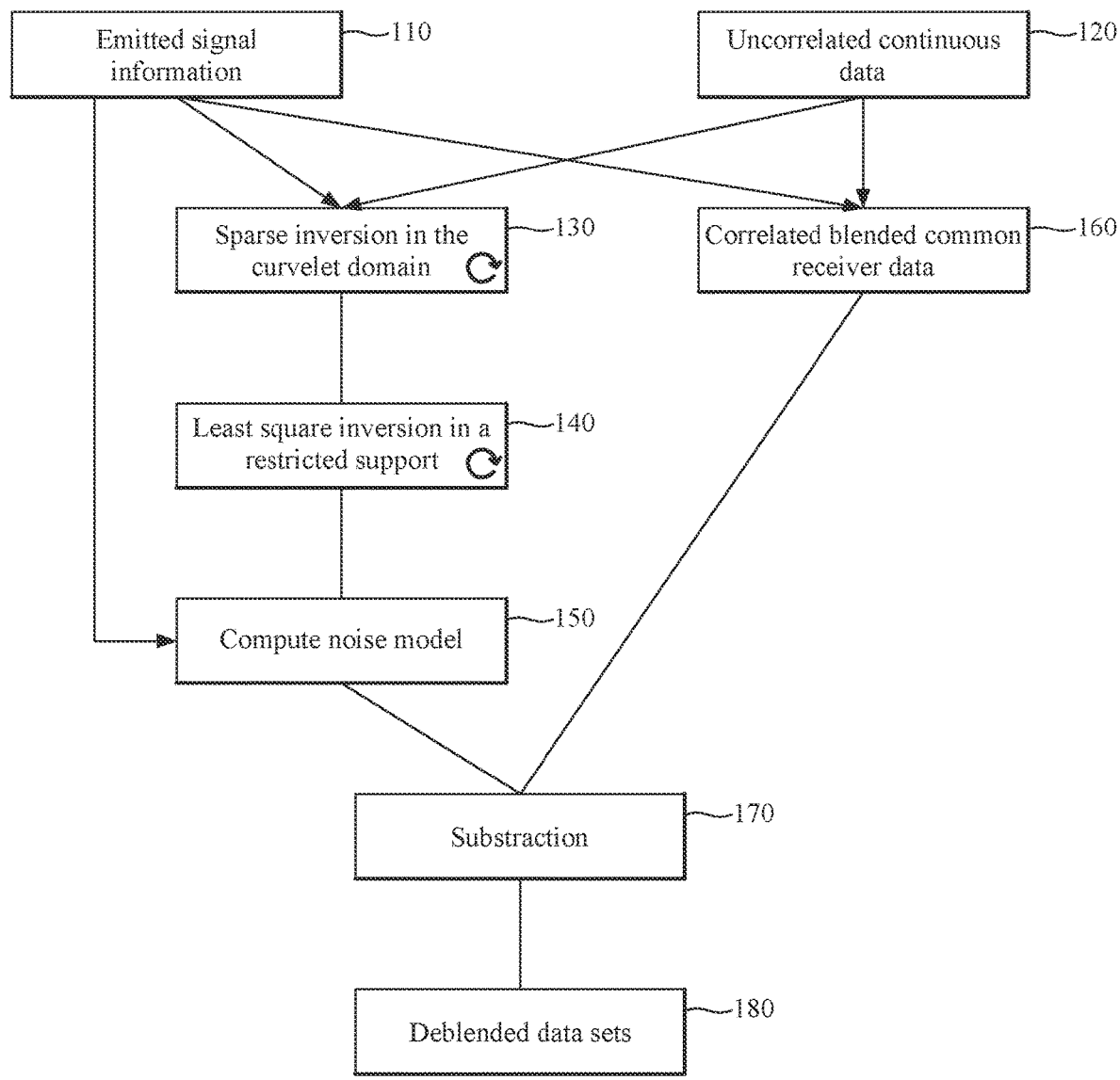
FIG. 1 illustrates a data processing flow of a deblending method according to an embodiment.

FIG. 1 is a processing data flow corresponding to a deblending method according to an embodiment. Seismic data recorded by one receiver 110 and emitted signal information 120 for the signals whose reflections were detected by the receiver are the starting point (i.e., the method's input). Although the following description refers to a single receiver, the following methods can be similarly applied for each of plural receivers.

The seismic data carries information about the distinct signals causing the reflections, and the underground formation's response (known as "seismic traces") between the receiver and the sources.

The emitted signals information may include the source signatures, the source activation times and the source positions when activated, etc. Some of the emitted signal information may be captured via measurements. For example, if the source emitting the signal is vibroseis, the source signature may be determined based on forces measurements.

A source operator A is built using the emitted signal information. Continuous record d of the receiver can be expressed as the result of applying operator A to the seismic traces u:

$$b = Au = MRu. \quad (1)$$

Operator A can be decomposed in a restriction operator R and a multiple convolution operator M. The restriction operator maps the volume of seismic traces to the acquired seismic traces. The multiple convolution operator computes, for each seismic trace, a convolution between the trace and the source signature emitted at the respective position and time. The summation of all these contributions forms (theoretically) the continuous record b.

At 130, a sparse inversion of seismic data 120 seeks a solution (i.e., a version of the underground formation's response) in the curvelet domain.

Data can be transformed in curvelet domain by applying a multi-scale and multi-dimensional transform as described in the article "The curvelet representation of wave propagators is optimally sparse" by E. J. Candés and L. Demanet published in *Comm. Pure Appl. Math.*, No. 58, pp. 1472-1528, 2005, and the article "Fast Discrete Curvelet Transforms," E. J. Candés, L. Demanet, et al., published in *SIAM Multiscale Model. Simul.*, No. 5, pp. 861-899, 2006. For example, for a two dimensional seismic sample D(t,s) at time t and position s, a curvelet coefficient $c(j, \vec{k}, l)$ for a frequency band j, dip l and time-space displacement $\vec{k}$, in a curvelet basis $\varphi_{j,\vec{k},l}$ is:

$$c(j, \vec{k}, l) = \int_{R^2} D(t, s) \phi_{j,\vec{k},l}(t, s) dt ds \quad (2)$$

In contrast to the time-space or frequency basis, a curvelet atom (unit vector of the transform domain basis) is localized in both frequency and time-space. Seismic data is represented by few non-zero coefficients in the curvelet domain. Although this embodiment refers to the curvelet domain, other domains may be considered. Other transforms usable to represent the seismic data in other domains may be: wavelet transforms (which were the first multi-scale transforms and are frequently used in signal processing, a Radon transform (which is based on dip decomposition), beamlets, shearlets, seislets, etc. All these transforms divide the Fourier domain in distinct entities, so that seismic data may be represented by coefficients associated with these entities.

Thus, the sparse (first) inversion seeks a vector x in the curvelet domain, vector x being related to the seismic traces u as:

$$u = \phi x \quad (3)$$

where $\phi$ is an inverse curvelet transform. Vector x is sparse because seismic data is represented by few non-zero coefficients in the curvelet domain.

Ideally, one would want to find vector x in the curvelet domain, which has fewest non-zero coefficients, and minimizes $$\|A\phi x - b\|_2^2 < \sigma, \quad (4)$$

where A is a source operator built using the emitted signal information and σ represents the noise level in raw records. However, optimization problem (4) is not solvable in a reasonable time over the curvelet domain. Therefore, the first (sparse) inversion seeks vector x, which minimizes a two-term cost function:

$$\|A\phi x - b\|_2^2 + \lambda \|x\|_1. \tag{5}$$

The value of balance coefficient λ (i.e., constraint's weight) is controlled by the operator running the software, and it is selected such that to achieve a reasonable number of coefficients (the higher the value the fewer coefficients).

This inversion may be solved using a Fast Iterative Shrinkage-Thresholding Algorithm, FISTA (which is described in the article "A fast iterative shrinkage-thresholding algorithm for linear inverse problems" by Amir Beck and Marc Teboulle, published in SIAM J. Img. Sci., No 2(1), pp. 183-202, March 2009) and the Uniform Discrete Curvelet Transform (which is described in the article "Uniform discrete curvelet transform" by T. T. Nguyen and H. Chauris, published in IEEE Transactions on Signal Processing, No. 58(7), pp. 3618-3634, July 2010).

In one embodiment, weights are applied to curvelets atoms (the weights discriminating the curvelets atoms based on their position or angular orientations in the volume). In this case, the inversion seeks vector $x_w$, in the curvelet domain, which minimizes:

$$\|A\phi x_w - b\|_2^2 + \lambda \|W x_w\|_1, \tag{6}$$

where W is a diagonal matrix of the weights.

As any iterative process, the first inversion stops when a predetermined criterion is met. The criterion may be performing a predetermined number of iterations, or achieving a target minimization (i.e., residual below a predetermined threshold). At the end of the inversion, a sub-domain of the curvelet domain (known as "restricted support") is defined by curvelets corresponding to the non-zero coefficients of the first inversion's solution.

Further, at 140, a least square inversion of the seismic data is performed on the restricted support. This least square inversion aims find a vector $x_s$ in the sub-domain that minimizes distance between data $(A\phi^{-1}x_s)$ reconstructed using vector $x_s$ and seismic data b:

$$\min_{x_s} \frac{1}{2}\|A\phi_s x_s - b\|_2^2, \tag{7}$$

where $\phi_s$ is the inverse curvelet transform in the sub-domain. Vector $x_s$ is an estimate of the underground formation response.

This second inversion may be solved using a conjugate gradient algorithm. The second inversion also ends when a predetermined criterion is met. This criterion may also be performing a predetermined number of iterations, or achieving a target minimization (i.e., residual below a predetermined threshold). The predetermined number of iteration for the first and the second inversion may be the same or different. The predetermined threshold for the second inversion has to be less than for the first minimization.

At 150, the solution vector $x_s$ is used to compute a noise model. When extracting a deblended dataset related to one signal, the overlapping reflections due to another signal are noise. The solution vector may be used to estimate the reflections due to the other signal(s) than a targeted signal.

Meanwhile (parallel or sequentially with operations 130-150), the seismic data 120 is correlated with the emitted signal information 110, to obtain correlated blended common receiver data 160. The computed noise model is subtracted from the correlated blended common receiver data 160, at 170, to obtain deblended datasets 180. These deblended datasets are then further processed to obtain images of the explored underground formation.

Figure 2:
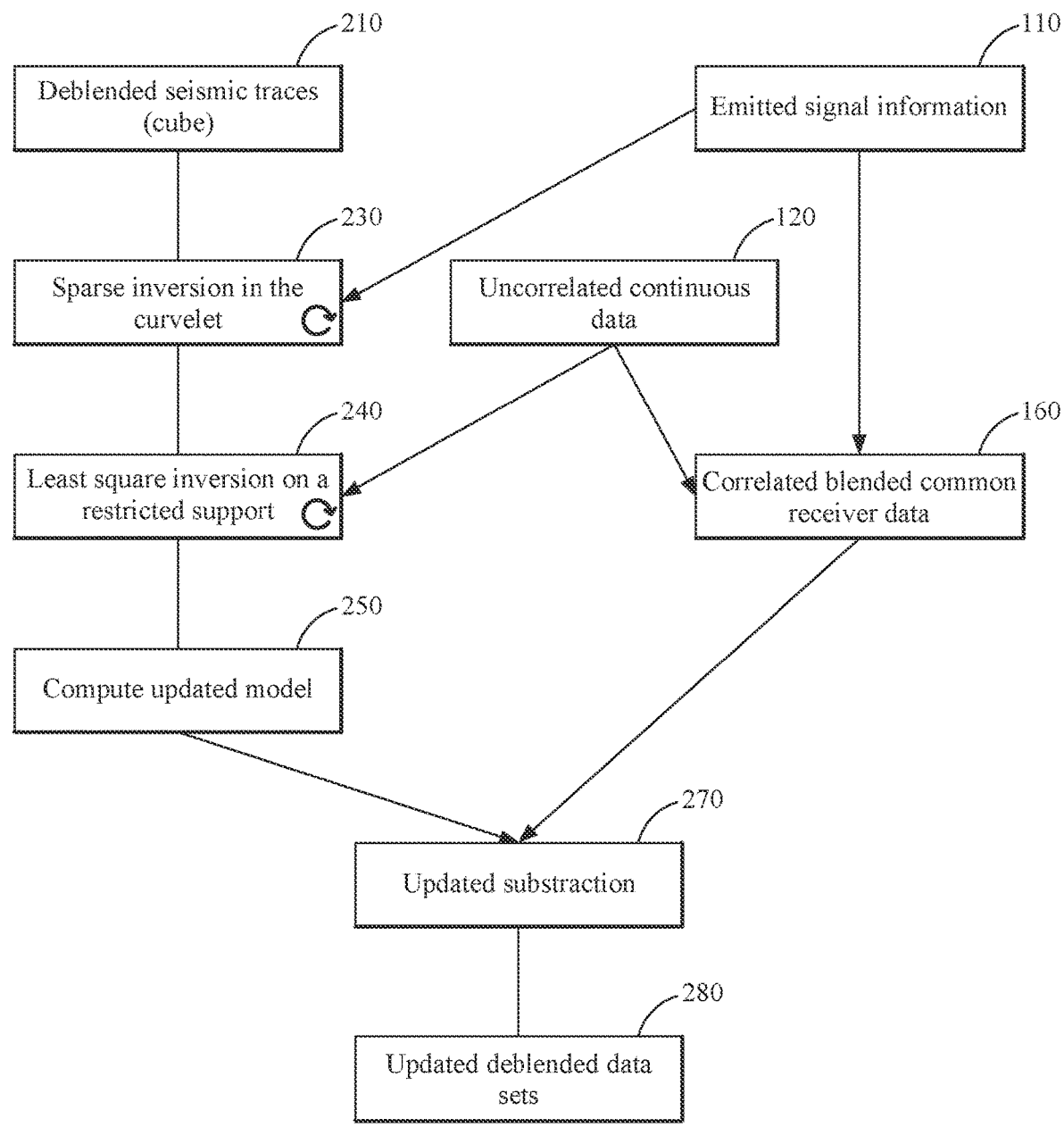
FIG. 2 illustrates another data processing flow of a deblending method according to another embodiment.

According to one embodiment, the deblending may then be enhanced by using the same double inversion strategy for one of the deblended datasets as illustrated by data flow in FIG. 2. A debleded dataset 210 focuses on one of the distinct signals whose reflections are recoded, and may be represented as a seismic trace volume b' of the receiver. Deblended dataset 210 may be one of the deblended datasets 180 or may have been obtained using another deblending method.

At 230, a sparse inversion of deblended dataset 210 seeks a vector x' in the curvelet domain, vector x' minimizing $$\tfrac{1}{2}\|\phi x' - b'\|_2^2 + \lambda \|x'\|_1. \tag{8}$$

A new sub-domain of the curvelet domain ("updated restricted support") is defined based on the non-zero coefficients of this first inversion's solution.

Then, at 240, least square inversion of the deblended dataset is performed on the updated restricted support. The solution of this second inversion is an updated vector $x_s'$ in the sub-domain that minimizes distance between data $(\phi x_s')$ simulated using this vector and seismic trace volume b'.

At 250, the updated vector $x_s'$ is used to compute an updated noise model that is then, at 270, subtracted from the correlated blended common receiver data 160, to obtain updated deblended datasets 280.

The methods according to various embodiments have been successfully tested for land seismic data acquired with simultaneous vibroseis.

Figure 3:
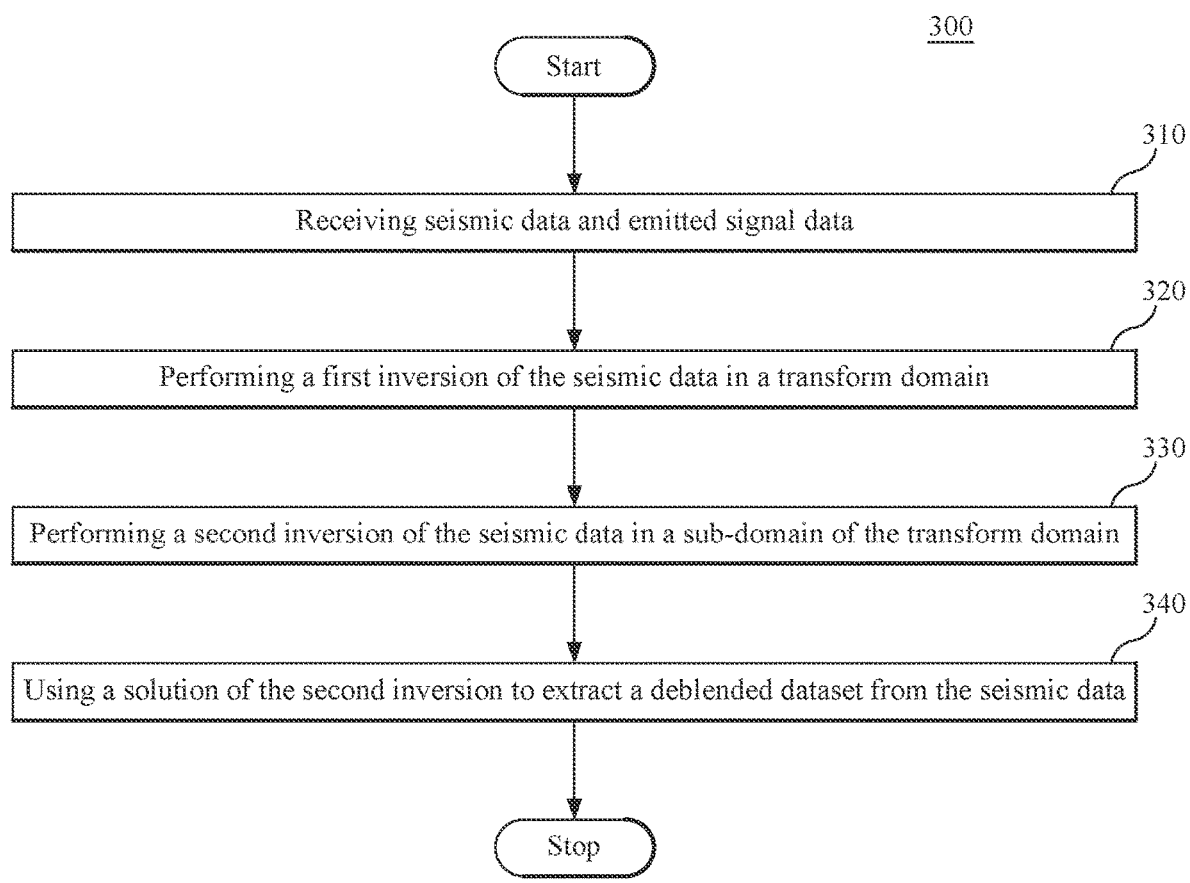
FIG. 3 is a flowchart of a deblending method according to yet another embodiment.

FIG. 3 is a flowchart of a deblending method 300 according to an embodiment. Method 300 includes receiving seismic data recorded by a receiver detecting simultaneously reflections due to distinct signals, and emitted signal information, at 310. The emitted signal information may include source signature, source activation time and source position for each signal. A source operator used in the first inversion (and also in the following second inversion) is built using the emitted signal information.

Method 300 further includes performing a first inversion of the seismic data in a transform domain, at 320. The first inversion is formulated to minimize a number of non-zero coefficients of the result. The transform domain may be the curvelet domain. In one embodiment, weights may be applied to discriminate between components.

A sub-domain of the transform domain is defined by vectors of a transform domain basis for which the first inversion has yielded the non-zero coefficients. Method 300 then performs a second inversion of the seismic data in this sub-domain at 330.

At 340, the solution of the second inversion is used to extract deblended seismic datasets corresponding to each distinct signal from the seismic data.

The methods described in this section have been successfully tested for land seismic data acquired with simultaneous vibroseis.

Figure 4:
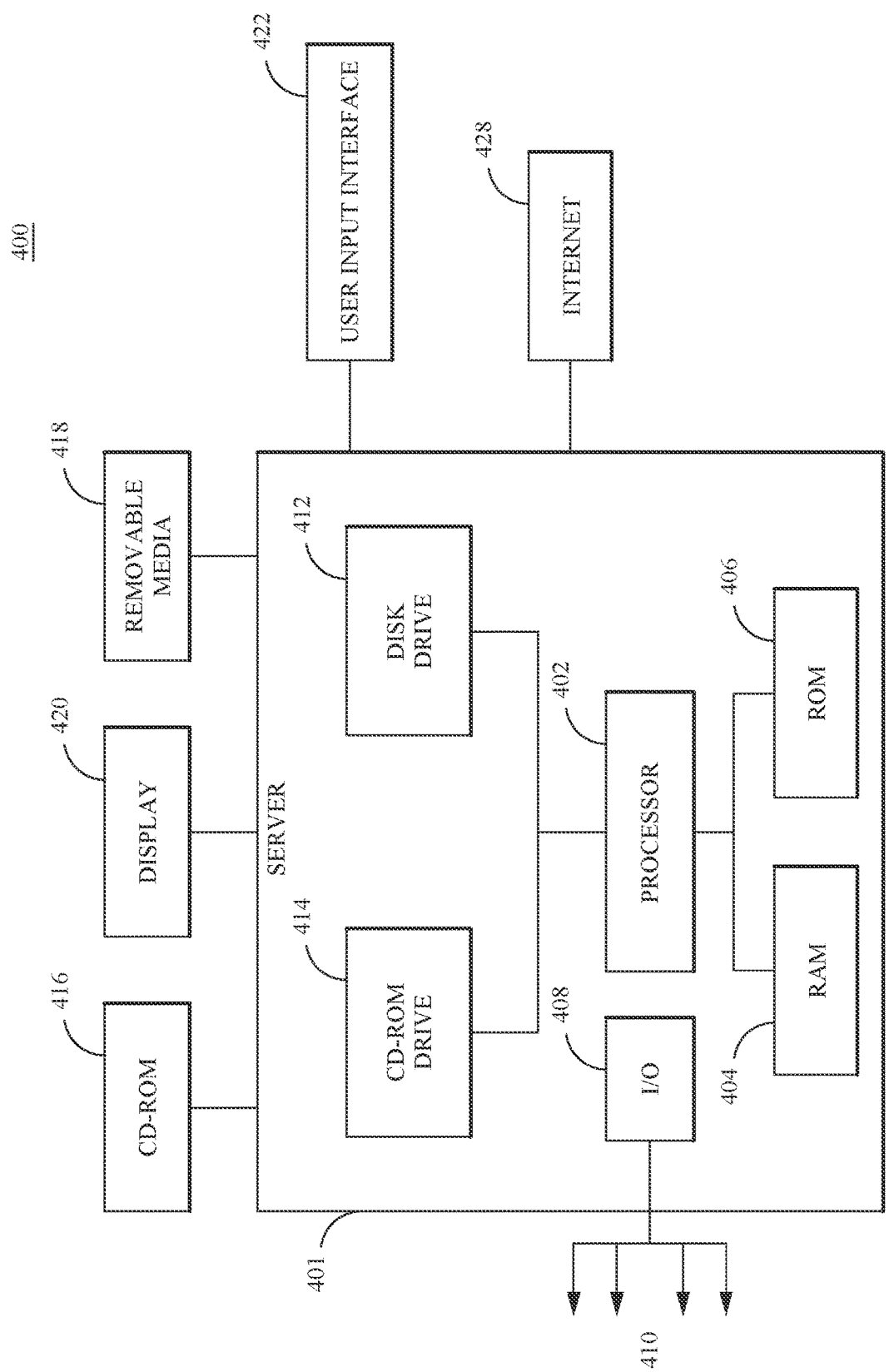
FIG. 4 is a block diagram of a data processing apparatus according to an embodiment.

FIG. 4 illustrates a block diagram of a seismic data processing apparatus 400 usable to perform these methods, according to an embodiment. Hardware, firmware, software or a combination thereof may be used to perform the various steps and operations. Apparatus 400 includes a computer or server 402 having one or more central processing units (CPU) 404 in communication with a communication module 406, one or more input/output devices (I/O) 410 and at least one storage device 408. Hardware, firmware, software or a combination thereof may be used to perform the various steps and operations of the methods described in this section.

Communication module 406 may be used to obtain the seismic datasets. Communication module 406 may intermediate wired or wireless communication of server 402 with other computing systems, databases and data acquisition systems across one or more local or wide area networks 412.

I/O devices 410 may be used to communicate with a user or to display any images or models of the surveyed underground formation. I/O devices 410 may include keyboards, point and click type devices, audio devices, optical media devices and visual displays.

CPU 404, which is in communication with communication module 406 and storage device 408, is configured to perform the first and second inversion, and to extract deblended datasets from seismic datasets as in any of the methods described in this section.

Storage device 408 may include magnetic media such as a hard disk drive (HDD), solid state memory devices including flash drives, ROM and RAM and optical media. The storage device may store data as well as software code for executing various functions including the deblending methods described in this section.

Figure 5:
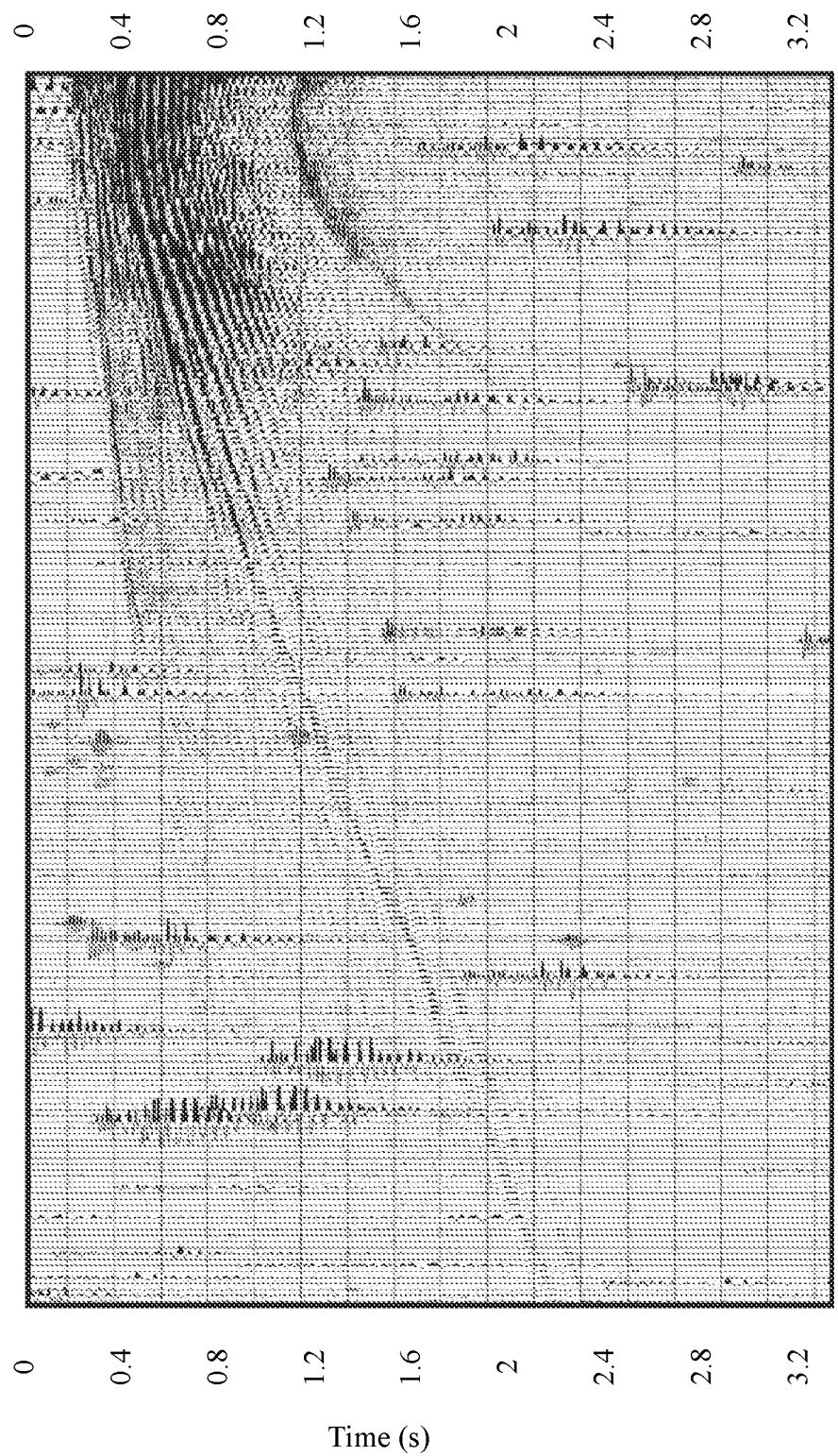
FIG. 5 is a graphic illustration of blended data in a receiver gather.
Figure 6:
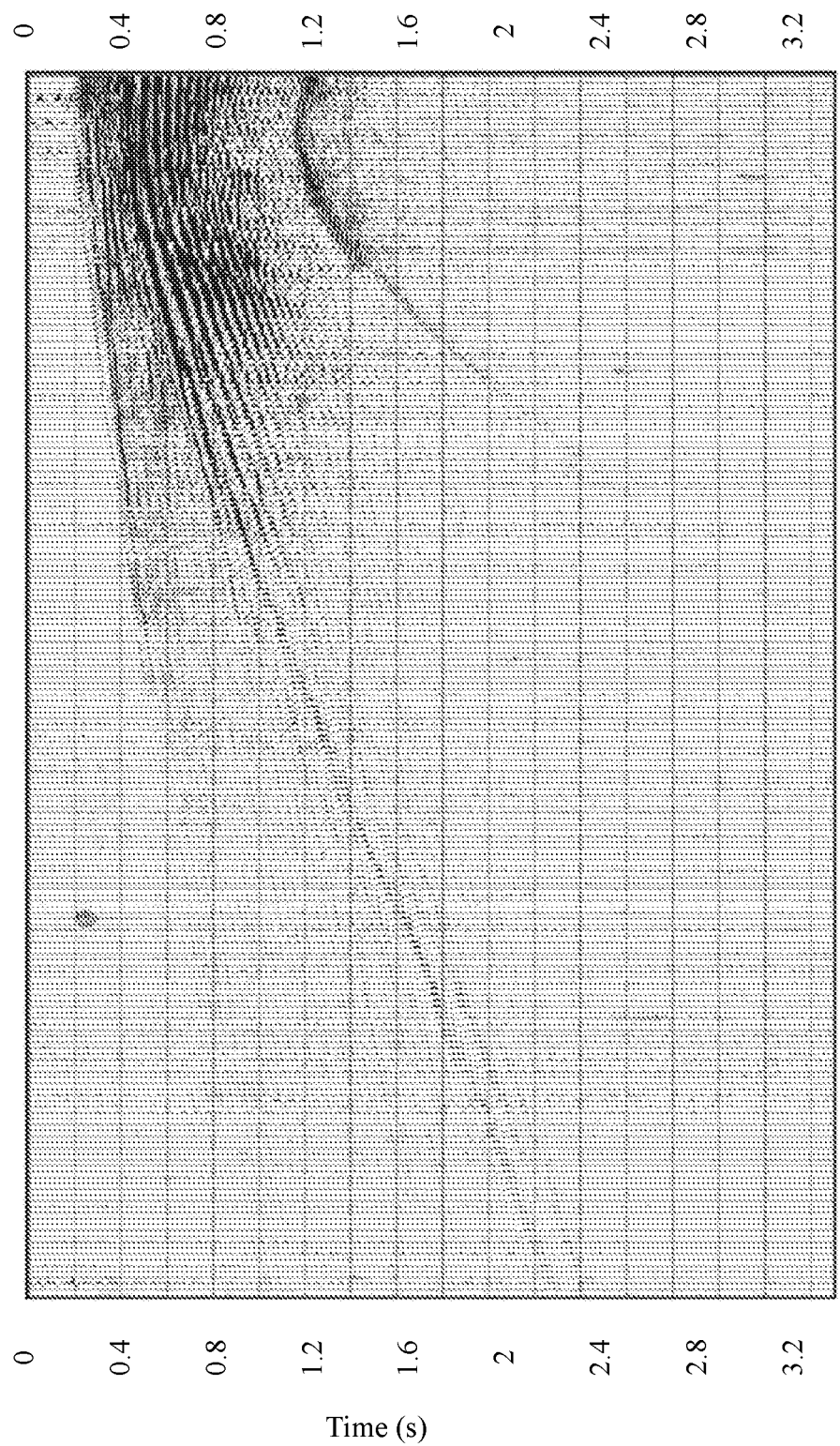
FIG. 6 is a graphic illustration of de-blended data obtained from the receiver gather illustrated in FIG. 5, using a method according to an embodiment.

FIG. 5 is a graphic illustration of blended data in a receiver gather. The vertical axis is time from the emission (increasing from the top to bottom) and the horizontal axis is one line of shots, the traces corresponding to 12.5 m spacing. FIG. 6 is a graphic illustration of de-blended data obtained from the receiver gather illustrated in FIG. 5, using a method according to an embodiment (e.g., method 300). The x and y axes in FIG. 6 have the same significance as in FIG. 5. A comparison of FIGS. 5 and 6 reveals the disappearance of the cross-talk noise in the de-blended data.

The disclosed exemplary embodiments provide methods and systems for deblending seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A deblending method for seismic data, the method comprising:
   receiving
     the seismic data recorded by a receiver detecting simultaneously reflections from an explored underground formation due to distinct signals emitted at different times, and
     emitted signal information;
   performing a first inversion of the seismic data to obtain an underground formation response in a transform domain, the first inversion using a source operator built based on the emitted signal information, and the first inversion being formulated to minimize a number of non-zero coefficients of a first inversion result expressed in a transform domain basis;
   performing a second inversion of the seismic data seeking the underground formation response in a sub-domain of the transform domain, the second inversion also using the source operator, and the sub-domain being defined by vectors of the transform domain basis for which the first inversion result has the non-zero coefficients; and
   using the underground formation response obtained in the second inversion, to extract a deblended dataset corresponding to one of the distinct signals, from the seismic data.

2. The method of claim 1, wherein the transform domain is a curvelet domain.

3. The method of claim 1, wherein the emitted signal information includes source signature, source activation time and source position for each of the distinct signals.

4. The method of claim 1, wherein the first inversion iteratively determines a vector x in the transform domain which minimizes $\|A\phi x - b\|_2^2 + \lambda \|x\|_1$, where A is the source operator built based on the emitted signal information, $\phi$ is an inverse transform operator, b is the seismic data, and $\lambda$ is a constraint weight.

5. The method of claim 2, wherein the first inversion iteratively determines a vector $x_w$ in the transform domain which minimizes $\|A\phi x_w - b\|_2^2 + \lambda \|Wx_w\|_1$, where W is a diagonal weight matrix distinguishing among curvelets, A is the source operator built using the emitted signal information, $\phi$ is an inverse transform operator, b is the seismic data, and $\lambda$ is a constraint weight.

6. The method of claim 1, wherein the first inversion is solved using a Fast Iterative Shrinkage-Thresholding Algorithm.

7. The method of claim 1, wherein the second inversion iteratively determines a vector $x_s$ in the sub-domain, the vector $x_s$ minimizing $\|A\phi_s x_s - b\|_2^2$, where A is the source operator built based on the emitted signal information, $\phi_s$ is an inverse transform operator in the sub-domain, and b is the seismic data.

8. The method of claim 1, wherein second inversion is solved using a conjugate gradient algorithm.

9. The method of claim 1, wherein sources generating the distinct signals are vibroseis, and the emitted signals information includes force measurements acquired when the sources emitted the distinct signals.

10. The method of claim 1, wherein the using of the underground formation response to extract the deblended dataset includes:
    generating a noise model;
    obtaining correlated receiver data by correlating the seismic data with the emitted signal information; and
    subtracting the noise model from the correlated receiver data.

11. The method of claim 1, further comprising:
- performing another first inversion on one of the deblended seismic dataset corresponding to the one of the distinct signals, the other first inversion being performed in the transform domain;
- performing another second inversion on the one of the deblended seismic datasets in another sub-domain of the transform domain, the other sub-domain being defined by other vectors of the transform domain basis for which a result of the other first inversion has other non-zero coefficients; and
- using a solution of the other second inversion to extract another deblended dataset corresponding to another one of the distinct signals, from the seismic data.

12. A seismic data processing apparatus, comprising:
- an interface configured to receive
  - seismic data recorded by a receiver detecting simultaneously reflections from an explored underground formation due to distinct signals emitted at different times, and
  - emitted signals information; and
- a data processing unit configured
  - to perform a first inversion of the seismic data seeking an underground formation response in a transform domain, the first inversion using a source operator built based on the emitted signal information, and the first inversion being formulated to minimize a number of non-zero coefficients of a first inversion result expressed in a transform domain basis,
  - to perform a second inversion of the seismic data seeking the underground formation response in a sub-domain of the transform domain, the second inversion also using the source operator, and the sub-domain being defined by vectors of the transform domain basis for which the first inversion result has the non-zero coefficients, and
  - to extract a deblended dataset corresponding to one of the distinct signals, from the seismic data, using the underground formation response obtained in the second inversion.

13. The seismic data processing apparatus of claim 12, wherein the transform domain is a curvelet domain.

14. The seismic data processing apparatus of claim 12, wherein the emitted signal information includes source signature, source activation time and source position for each of the distinct signals.

15. The seismic data processing apparatus of claim 12, wherein the first inversion iteratively determines a vector x in the transform domain which minimizes $\|A\phi x-b\|_2^2+\lambda\|x\|_1$, where A is the source operator built based on the emitted signal information, $\phi$ is an inverse transform operator, b is the seismic data, and $\lambda$ is a constraint weight.

16. The seismic data processing apparatus of claim 13, wherein, in the first inversion, the data processing unit iteratively determines a vector $x_w$ in the transform domain which minimizes $\|A\phi x_w-b\|_2^2+\lambda\|Wx_w\|_1$, where W is a diagonal weight matrix distinguishing among curvelets, A is the source operator built using the emitted signal information, $\phi$ is an inverse transform operator, b is the seismic data, and $\lambda$ is a constraint weight.

17. The seismic data processing apparatus of claim 12, wherein, in the second inversion, the data processing unit iteratively determines a vector $x_s$ in the sub-domain, the vector $x_s$ minimizing $\|A\phi_s x_s-b\|_2^2$, where A is the source operator built based on the emitted signal information, $\phi_s$ is an inverse transform operator, and b is the seismic data.

18. The seismic data processing apparatus of claim 12, wherein the data processing extracts the deblended dataset by:
- generating a noise model;
- obtaining correlated receiver data by correlating the seismic data with the emitted signal information; and
- subtracting the noise model from the correlated receiver data.

19. The seismic data processing apparatus of claim 12, wherein the data processing unit is further configured:
- to perform another first inversion on the deblended dataset corresponding to the one of the distinct signals, the other first inversion being performed in the transform domain;
- to perform another second inversion on the one of the at least one deblended dataset in another sub-domain of the transform domain, the other sub-domain being defined by other vectors of the transform domain basis for which a result of the other first inversion has other non-zero coefficients; and
- to use a solution of the other second inversion to extract another a-deblended dataset corresponding another one of the distinct signals, from the seismic data.

20. A non-transitory computer readable medium storing executable codes which, when executed by a data processing unit make the data processing unit to perform a seismic data deblending method, the method comprising:
- receiving
  - seismic data recorded by a receiver detecting simultaneously reflections from an explored underground formation due to distinct signals emitted at different times, and
  - emitted signal information;
- performing a first inversion of the seismic data seeking an underground formation response in a transform domain, the first inversion using a source operator built based on the emitted signal information, and the first inversion being formulated to minimize a number of non-zero coefficients of a first inversion result expressed in a transform domain basis;
- performing a second inversion of the seismic data seeking the underground formation response in a sub-domain of the transform domain, the second inversion also using the source operator, and the sub-domain being defined by vectors of the transform domain basis for which the first inversion result has the non-zero coefficients; and
- using the underground formation response obtained in the second inversion, to extract a deblended dataset corresponding to one of the distinct signals, from the seismic data.

* * * * *